Nov. 22, 1966         J. G. BAKER         3,286,548
STEERING ACTUATOR FOR HYDROFOIL VEHICLES
Filed May 14, 1965                         2 Sheets-Sheet 1

INVENTOR.
JOHN G. BAKER
BY O.E. Hodges
Harvey A. David
ATTYS.

United States Patent Office 3,286,548
Patented Nov. 22, 1966

3,286,548
STEERING ACTUATOR FOR HYDROFOIL VEHICLES
John Gordon Baker, Evansville, Wis., assignor, by mesne assignments, to the United States of America as represented by the Secretary of the Navy
Filed May 14, 1965, Ser. No. 456,010
9 Claims. (Cl. 74—626)

This invention relates to improvements in power steering means, and more particularly to power steering actuators suitable for power boats having both rudder and hydrofoil steering systems.

It is a primary object of this invention to provide an improved power steering actuator which is self-centering upon release of the steering wheel or other steering input control, and which is particularly suitable for use in connection with steering means having little or no self-centering moment of its own such as in screw operated hydrofoil steering means.

It is another object of this invention to provide an improved power boat steering actuator which is operable to selectively actuate one or the other of hydrofoil and rudder steering systems in accordance with whether the boat is operating on its hydrofoils or in a conventional hullborne mode.

Another object of this invention is the provision of a novel power steering actuator of the foregoing character which is self-centering upon release of the steering wheel when the actuator is in at least one of its modes of operation and is shiftable into that mode only when steering is centered in the other mode, whereby the operator will not be required to cope with an unexpected course change upon shifting from one mode of steering operation to the other.

As another object this invention aims to provide a noval and improved steering actuator comprising a fast slew steering control member which can be used in lieu of the conventional steering wheel and shaft which require a number of turns from full left or right helm position to the other.

Figure 1:
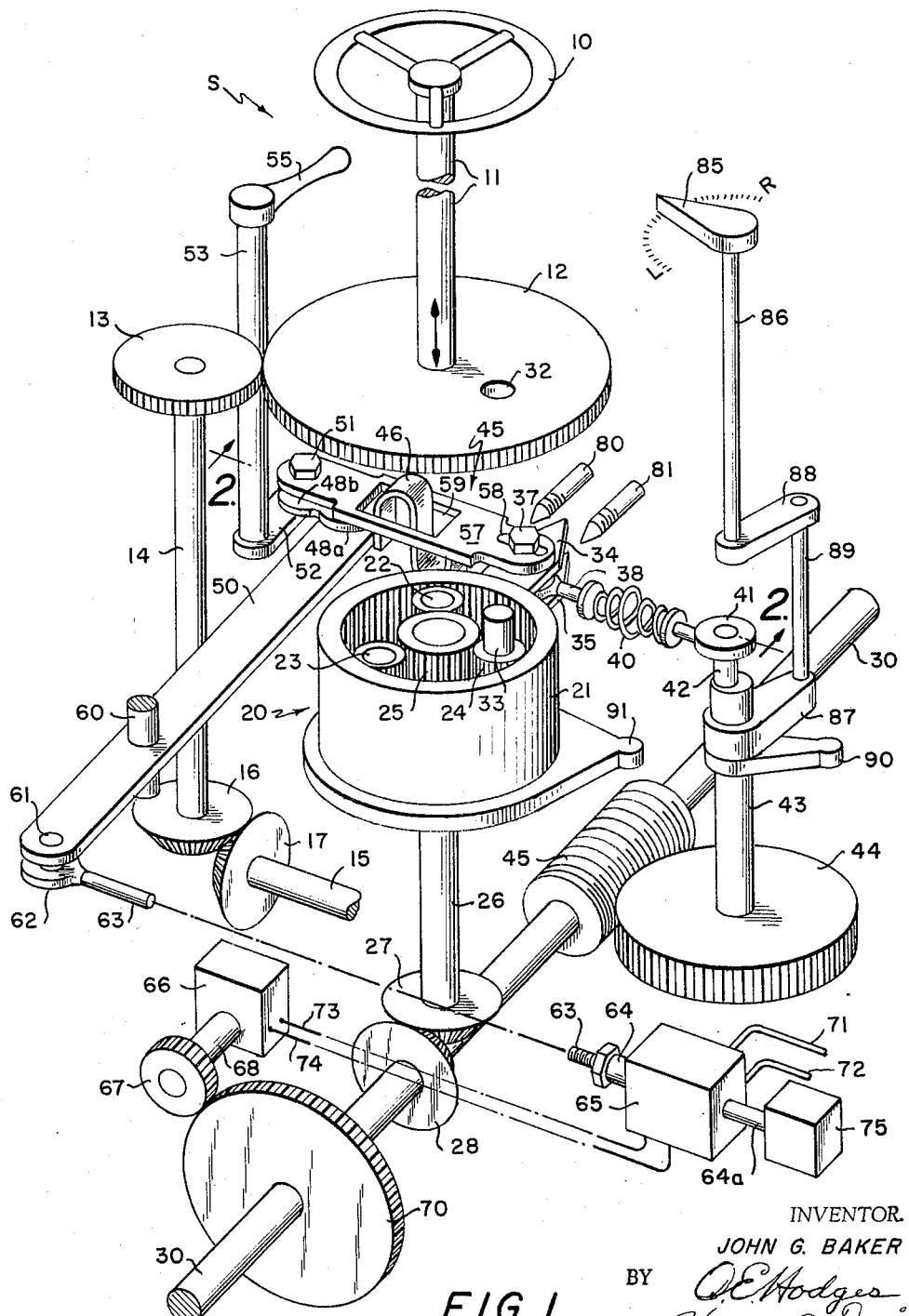
Figure 2:
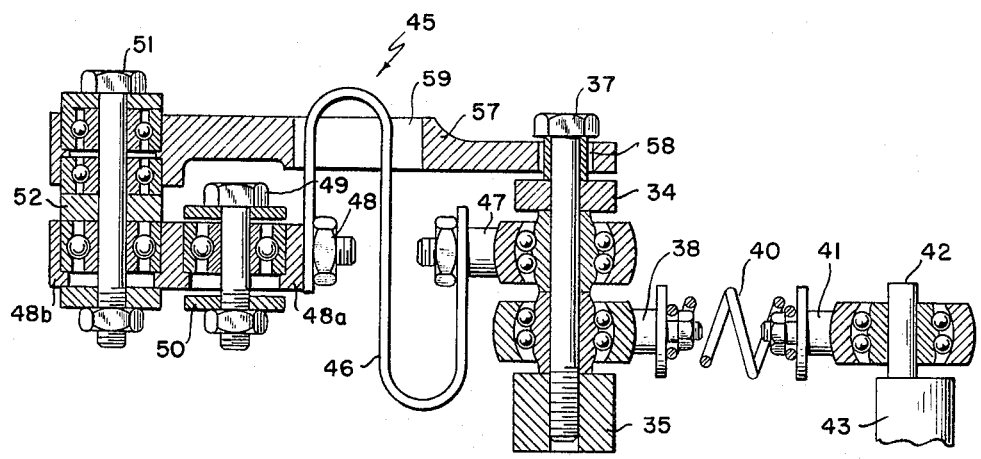

Other objects and advantages of the invention will become apparent from the following detailed description of a presently preferred embodiment thereof, read in conjunction with the accompanying steets of drawings forming a part of this specification, and in which:

FIG. 1 is perspective schematic illustration of a steering actuator embodying the invention; and FIG. 2 is an enlarged sectional view of a portion of the actuator or FIG. 1 taken along line 2—2 thereof.

In the form of the invention illustrated in the drawings described hereinafter there is provided a steering actuator, generally indicated at S, which is selectively operable to position a conventional steering rudder (not shown) of a hydrofoil boat when hullborne or to actuate hydrofoil steering means (not shown) when the boat is foilborne. In the latter mode of operation the steering actuator S provides a power assist, is self-centering and includes a rapid steering slew control all as will be more fully explained hereinafter.

Referring to FIG. 1, an exemplary embodiment of the actuator S includes a conventional steering wheel 10 fixed to the upper end of a rotatable steering input shaft 11 having fixed at its lower end a gear 12. When operating in the hullborne, rudder steering mode the gear 12 is in meshing engagement with a second gear 13 which is fixed to one end of a shaft 14 to effect rotation thereof proportional to rotation of the steering wheel. Rotational movements of the shaft 14 are transmitted to a first output shaft 15 by cooperating bevel gears 16, 17 fixed respectively to the shafts 14 and 15. The output shaft 15 is connected by suitable means (not shown) for utilizing rotary movements of the shaft to position the rudder of the boat in response to rotary movements of the steering wheel 10.

Disposed in axial alignment with the steering input shaft 11 and gear 12 is an epicyclic or planetary differential gear assembly generally indicated at 20. The differential gear assembly 20 comprises a reaction gear member in the form of an outer ring gear 21 which is in meshing engagement with a plurality of planetary pinions 22, 23 and 24. The pinions 22, 23 and 24, which mesh with a central sun gear 25, are connected together by carrier or spider means (not shown) for simultaneous epicyclic rotation within the ring gear 21 in a manner common to planetary gearing in general. The sun gear 25 is fixed to one end of a shaft 26, on the other end of which is fixed a bevel gear 27.

The bevel gear 27 meshes with a bevel gear 28 fixed to the central portion of a transverse second output shaft 30. The transverse shaft 30 is in turn connected at opposite ends by suitable means (not shown) to hydrofoil elements which are positionable by rotation of shaft 30 in one direction or the other to effect steering of the boat when operating in the foil-borne mode.

When operation of the boat is to be shifted from the hullborne to the foilborne mode, the steering wheel 10 is turned to a centered position bringing the rudder amidships. This aligns an opening 32 in gear 12 with a pin 33 extending axially from the planetary pinion 24, whereupon the wheel 10 and shaft 11 may be depressed to disengage gear 12 from gear 13 and to engage the gear 12 with the pin 33 of pinion 24. The steering shaft 11 is thereby coupled to the pinion 24, and to the pinions 22 and 23 which, as already mentioned, are connected together as by a common carrier means.

The ring gear 21 comprises a pair of radially extending, axially spaced arms 34 and 35 having aligned openings near their outer ends in which is secured a pivot bolt 37. As is best illustrated in FIG. 2, the bolt 37 passes through the eye of a pivot member 38 fixed to one end of a self-centering spring 40, the other end of which spring is pivotally connected by a member 41 to an eccentric crank pin 42 at one end of a shaft 43. The shaft 43 is driven in a rotational sense from the transverse shaft 30 by a worm wheel 44 and worm 45 fixed to the respective shafts. Accordingly, the shaft 43 assumes rotational positions corresponding to the extent of rotation of shaft 30 in either direction, which rotational positions are utilized for purposes which will be made apparent as the description proceeds.

The ring gear 21 is resiliently constrained against free rotational movement by the self-centering spring 40 so that when the steering wheel 10 is rotated, the pinions 22, 23 and 24 react against the constrained ring gear and tend to rotate the sun gear 25 and its associated shafting and gearing 26, 27, 28, 29 and 30 connected to the hydrofoil steering means.

Because rotation of the sun gear 25 is opposed by inherent frictional and other resistances of the hydrofoil steering means and of the gearing and shafting leading thereto, there will be established through the pinions 22, 23 and 24 a reaction torque in the ring gear 21 proportional to the steering effort applied to the wheel 10. This reaction torque is manifested by corresponding small rotational movements of the ring gear 21 against the restraint of the spring 40. These movements of the ring gear 21 are utilized to control application of externally supplied power to the rotation of the shaft 30.

To this end the apparatus includes a resilient connecting link which is generally indicated at 45 and is best illustrated in FIG. 2. The link 45 comprises a relatively stiff serpentine spring 46 which is conveniently formed from flat spring stock. The spring 46 has one end pivotally connected to the arms 34, 35 of the ring gear 21 as by a pivot member 47 the eye of which is engaged by pivot bolt 37. The other end of spring 46 is pivotally connected by one eye portion 48a of a double pivot member 48 and a bolt 49 to one end of a lever 50.

A second eye portion 48b of the member 48 is provided with a pivot bolt 51 forming pivotal connection of the link 45 with an arm 52 extending radially from a rapid slew control shaft 53. The shaft 53, which is in effect a second steering input shaft, is suitably journaled for rotary movements about its long axis and is provided with a control handle 55, the use of which is later discussed in more detail.

The link 45 further comprises an elongated, motion limiting plate 57, one end of which is pivotally connected by bolt 51 and member 48 to the arm 52 and to the lever 50. The other end of the plate 57 is provided with a slot 58 through which the pin 37 extends to form a lost-motion connection between the plate and the ring gear 21. The central portion of the plate 57 is conveniently provided with an opening 59 to accommodate the serpentine spring 46 as illustrated. The plate 57 normally plays no part in transmission of forces through link 45, these generally being transmitted by the serpentine spring 46. However, in the event of severe overloads on the link 45, or in the event of breakage of spring 46, the plate 57 becomes operative to maintain operation of the actuator S.

The lever 50 is pivoted at 60 intermediate the ends thereof and has its end remote from link 45 pivotally connected at 61 to an end member 62 of a rod 63. The rod 63 has its other end adjustably connected to the valve stem 64 of a four-way motor controlling hydraulic valve 65.

The valve 65 controls operation of a reversible hydraulic motor 66 which has a pinion 67 fixed to its output shaft 68 and in driving engagement with a gear 70 fixed to the transverse second output shaft 30.

The four way valve 65 may be of any suitable well known construction, such as of the spool valve type, which may be connected to hydraulic pressure fluid supply and return lines 71 and 72 and serves to control the flow of hydraulic pressure fluid to and from the motor 65 through lines 73 and 74 in response to movements of the ring gear 21 transmitted via link 45, lever 50, rod 63 and valve stem 64. Suffice it to say that when the ring gear 21 is in its illustrated neutral position, flow through the motor is prevented by the valve 65, and that movement of the ring gear in one direction from the neutral position causes the valve to permit fluid flow effecting operation of the motor in one direction while movement of the ring gear in the other direction from the neutral position causes the valve to permit fluid flow effecting operation of the motor in its other direction.

The valve operating movements of the valve stem 64 are preferably damped by means such as a double-acting hydraulic damper 75 which is operatively connected to an extension 64a of the valve stem. The damper 75 may be of any conventional construction, for example of the type having a plunger element, movements of which are opposed by restricted flow of silicone oil or the like. The damper 75 and resilient link 45 cooperate to provide smooth steering control by eliminating response to transient jarring effects encountered during operation in choppy water or the like and which might otherwise be fed into the apparatus through the output shafting or through the operator.

Assuming the boat to be in the foilborne mode and with the opening 32 of gear 12 engaged by the pin 33, the operation of the apparatus 10 may be described as follows. When the steering wheel 10 is in a centered position and the boat is running a straight ahead course, the apparatus is in a balanced condition with the motor 66 stopped and the ring gear 21 with its arm 34 in its neutral position with respect to a pair of adjustable stop screws 80 and 81. These stop screws may be adjusted to limit maximum running speed of the motor 66.

Application of steering effort tending to rotate the wheel 10 in a counter-clockwise direction develops in the ring gear 21 a counter-clockwise torque proportional to the applied steering effort and resulting in a small rotational movement of the ring gear in that direction. This movement, which is opposed by the spring 40, is transmitted by link 45, lever 50, and rod 63 to the hydraulic valve 65 which is thereby conditioned to cause motor 66 and pinion 67 to rotate the gear 70 and output shaft 30 in a clockwise direction as viewed in FIG. 1. The motor 66 thereby supplies motive power through shaft 30 for causing the hydrofoil steering means to alter the course of the boat in the desired direction.

Rotation of the shaft 30 in the mentioned clockwise direction acts through bevel gears 28, 27, and shaft 26 to rotate the sun gear 25 in the same direction as steering effort is applied to the wheel 10 which will thereby be rotated in the desired direction so long as the steering effort is maintained (within rotational limits later to be described). If the steering effort is relaxed and the wheel 10 held in a rotated position, the rotation of the sun gear 25 will continue only until the ring gear 21 is returned to its neutral position by the pinions 22, 23 and 24 whereby the valve 65 is actuated to stop the motor 66 and the course altering condition of the hydrofoil steering means is maintained.

The rotation of the shaft 30 is transmitted via worm 45, worm wheel 44, and the shaft 43 to the eccentric crank pin 42. Under the conditions just described the crank pin 42 effects elongation of the self-centering spring 40 which tends to rotate the ring gear in a clockwise direction with a force proportional to the degree of rotation of the shaft 30.

The degree of rotation is conveniently indicated by means of a pointer 85 carrier on a stub shaft 86 which is coaxial with shaft 43 and driven therefrom by arms 87, 88, and a connecting throw 89.

Upon release of the steering wheel 10 by the operator, the ring gear 21 moves in the clockwise direction under the influence of spring 40 and acts through link 45, lever 50, and rod 63 to condition the valve 65 so as to cause the motor 66 to drive the gear 70 and shaft 30 in a counter-clockwise direction. This, of course acts to bring the hydrofoil steering means to a straight course producing condition as will be indicated by pointer 85. Simultaneously, the wheel 10 is automatically returned to its centered position by rotation of the sun gear 25 acting to revolve the pinions 22, 23, 24 about the central axis of the planetary system. As the straight course condition is attained, the eccentric crank pin 42 acts through the spring 40 to return the ring gear 21 to its neutral position whereby the valve 65 is conditioned to stop the hydraulic motor 66.

The sequences of events which occur as a result of steering efforts applied to the wheel 10 in the opposite or clockwise direction are similar to those just described with reference to counter-clockwise steering efforts, the movements of the various parts being, of course, reversed in direction.

The rotation of the output shaft 30 in either direction is limited by the provision of an arm 90 which is fixed for rotation with shaft 43 and cooperates with a projection 91 of the ring gear 21 to move the latter in the proper direction to terminate operation of the motor 66. Thereafter, release of the steering wheel 10 permits the spring 40, which has either been stretched or compressed depending on the direction of steering, to move the ring gear in the direction required to return the apparatus to a centered and balanced condition.

Because hydrofoil steering is less responsive when the boat is operating foilborne but at relatively low speeds, and since the planetary gearing ratio is usually such that a number of turns of the wheel 10 are required from full left to full right, prolonged steering under these conditions would be laborious to the operator. It is for this reason that the actuator S includes the slew control including handle 55, second steering input shaft 53, arm 52 and pivoted connection 51. Thus, the handle 55 may be utilized in lieu of the wheel 10 and planetary differential gearing 20 to directly actuate the four way valve 65 and effect steering control. When utilizing the slew handle 55, in the form of the invention described herein, the wheel 10 will follow the steering movements and the operator may revert to wheel steering at any moment without delay. Also, the self-centering means and steering indicator pointer 85 will be operative while using the slew control handle 55.

Because of the self-centering characteristic of the hydrofoil steering portion of the actuator S, the operator can always be assured of being able to shift from rudder steering to hydrofoil steering without searching for the engagement position, merely by first bringing the rudder controlled boat to a straight ahead course and then depressing the steering wheel 10.

Of course, power steering and self-centering means similar to that described above for the hydrofoil mode can be added for the rudder steering mode making the entire system self-centering so that either portion of the apparatus which is in a stand-by condition will in effect be locked in a centered position ready for shifting of steering modes. This of course would require a mere duplication of the self-centering and power applying elements to be connected to the rudder drive shafting and gearing and need not be further described in detail.

From the foregoing detailed description it will be appreciated that the present invention has provided a novel and improved steering actuator apparatus by which the aforementioned objects and advantages, as well as others apparent from the description, have been attained.

Of course the principles of the invention may be practiced in other embodiments than the actuator S which has been described by way of example. Accordingly, although the invention has been described in considerable detail with reference to a specific steering actuator apparatus, it will be understood that the invention is not limited thereto, but rather the invention includes all those modifications, adaptations, substitutions and uses as are reasonably embraced by the scope of the claims hereof.

What is claimed is:

1. A self-centering power steering actuator comprising:
a steering input member movable in first and second directions from a neutral position;
an output member for connection to steering means;
a reversible motor coupled to said output member for driving thereof in opposite directions from a centered position;
motor control means for controlling operation of said motor in response to movements of said input member, said motor being operative to move said output member in one direction from said centered position when said input member is to one side of said neutral position, and said motor being operative to move said output member in the opposite direction when said input member is to the other side of said neutral position;
centering spring means;
means connecting said spring means to said input member, and means connecting said spring means to said output member;
said input member being free of biasing effects of said spring means when said input member is in its neutral position and said output member is in its centered position, and said output member being operative when in positions to either side of its centered position to cause said spring means to bias said input member in that direction from its neutral position which will cause said motor to return said output member to its centered position.

2. A self-centering power steering actuator comprising:
a steering input member rotatable in first and second directions from a neutral position;
rotatable output shaft for connection to steering means;
a reversible motor coupled to said output shaft for driving thereof in opposite directions from a centered position;
motor control means for controlling operation of said motor in response to movements of said input member, said motor being operative to rotate said output member in one direction from said centered position when said input member is to one side of said neutral position, and said motor being operative to rotate said output member in the opposite direction when said input member is to the other side of said neutral position;
centering spring means;
means connecting said spring means to said input member, and crank means connecting said spring means to said output shaft;
said input member being free of biasing effects of said spring means when said input member is in its neutral position and said output shaft is in its centered position, and said output shaft being operative through said crank means when in positions to either side of its centered position to cause said spring means to bias said input member in that direction from its neutral position which will cause said motor to return said output shaft to its centered position.

3. A self-centering power steering actuator comprising:
a steering input shaft rotatable in first and second directions from a centered position;
a rotatable output shaft for connection to steering means;
differential gear means interconnecting said input shaft and said output shaft and including a reaction gear member;
a reversible motor coupled to said output shaft for driving thereof in opposite directions from a centered position;
motor control means for controlling operation of said motor in response to movements of said reaction gear member in one direction or the other from a neutral position, said motor being operative to rotate said output shaft in one direction from its centered position when said reaction gear member is to one side of said neutral position, and said motor being operative to move said output shaft in the opposite direction when said reaction gear gear member is to the other side of said neutral position;
centering spring means connected to said reaction gear member;
crank means connecting said spring means to said output shaft;
said reaction gear member being free of biasing effects of said spring means when said input shaft is in its centered position and said output shaft is in its centered position, and said output shaft being operative through said crank means when in positions to either side of its centered position to cause said spring means to bias said reaction gear member in that direction from its neutral position which will cause said motor to return said output shaft to its centered position.

4. A steering actuator comprising:
a rotatable steering input shaft;
first and second rotatable output shafts for connection to first and second steering means respectively;
shiftable means for alternatively connecting said input shaft to first and second gear means associated with said first and second output shafts respectively;

said second gear means comprising differential gearing for interconnecting said input shaft and said second output shaft and including a reaction gear member;

a reversible motor coupled to said output shaft for driving thereof in opposite directions from a centered position;

motor control means for controlling operation of said motor in response to movements of said reaction gear member in either direction from a neutral position, said motor being operative to rotate said second output shaft in one direction from its centered position when said reaction gear member is to one side of said neutral position, and said motor being operative to move said second output shaft in the opposite direction when said reaction gear member is to the other side of said neutral position;

centering spring means connected to said reaction gear member;

crank means connecting said spring means to said second output shaft;

said reaction gear member being free of biasing effects of said spring means when said input shaft is in its centered position and said second output shaft is in its centered position, and said second output shaft being operative through said crank means when in a position to either side of its centered position to cause said spring means to bias said reaction gear member in that direction from its neutral position which will cause said motor to return said second output shaft to its centered position.

5. A steering actuator as defined in claim 4 and wherein said crank means comprises an eccentric crank driven from said second output shaft by reduction gearing.

6. A steering actuator as defined in claim 4 and comprising limit means responsive to predetermined rotation of said second output shaft in either direction from its centered position to engage and rotate said reaction gear member to said neutral position.

7. A steering actuator comprising:
a first rotatable steering input shaft;
first and second rotatable output shafts for connection to first and second steering means respectively;
shiftable means for alternatively connecting said input shaft to first and second gear means associated with said first and second output shafts respectively;
said second gear means comprising differential gearing for interconnecting said input shaft and said second output shaft and including a movable reaction gear member;

a reversible hydraulic motor coupled to said output shaft for driving thereof in opposite directions from a centered position;

motor reversing control valve means;

link means connecting said reaction gear member to said valve means for controlling operation of said motor in response to movements of said reaction gear member in either direction from a neutral position, said motor being operative to rotate said second output shaft in one direction from its centered position when said reaction gear member is to one side of said neutral position, and said motor being operative to move said second output shaft in the opposite direction when said reaction gear member is to the other side of said neutral position;

centering spring means connected to said reaction gear member;

crank means connecting said spring means to said second output shaft;

said reaction gear member being free of biasing effects of said spring means when said input shaft is in its centered position and said second output shaft is in its centered position, and said second output shaft being operative through said crank means when in a position to either side of its centered position to cause said spring means to bias said reaction gear member in that direction from its neutral position which will cause said motor to return said second output shaft to its centered position; and a second steering input shaft, said second input shaft being connected to said link means for operation of said control valve means.

8. A steering actuator as defined in claim 7 and wherein said crank means comprises an eccentric crank driven from said second output shaft by reducing gearing.

9. A steering actuator as defined in claim 7 and comprising limit means responsive to predetermined rotation of said second output shaft in either direction from its centered position to engage and rotate said reaction gear member to said neutral position.

References Cited by the Examiner
UNITED STATES PATENTS 2,936,976   5/1960   Greenland et al. ____ 244—83.7
2,997,895   8/1961   White _____ 74—626

FRED C. MATTERN, Jr., *Primary Examiner.*

W. S. RATLIFF, *Assistant Examiner.*